(12) United States Patent
Zhang et al.

(10) Patent No.: US 12,465,977 B2
(45) Date of Patent: Nov. 11, 2025

(54) PREPARATION METHOD FOR ADDITIVE MANUFACTURING TITANIUM ALLOYS

(71) Applicant: INSTITUTE OF METAL RESEARCH, CHINESE ACADEMY OF SCIENCES, Liaoning (CN)

(72) Inventors: Zhefeng Zhang, Liaoning (CN); Zhan Qu, Liaoning (CN); Zhenjun Zhang, Liaoning (CN); Rui Liu, Liaoning (CN)

(73) Assignee: INSTITUTE OF METAL RESEARCH, CHINESE ACADEMY OF SCIENCES, Liaoning (CN)

( * ) Notice: Subject to any disclaimer, the term of this patent is extended or adjusted under 35 U.S.C. 154(b) by 0 days.

(21) Appl. No.: 18/875,719

(22) PCT Filed: Jul. 26, 2024

(86) PCT No.: PCT/CN2024/107679
§ 371 (c)(1),
(2) Date: Dec. 16, 2024

(87) PCT Pub. No.: WO2025/107698
PCT Pub. Date: May 30, 2025

(65) Prior Publication Data
US 2025/0170651 A1 May 29, 2025

(30) Foreign Application Priority Data
Nov. 22, 2023 (CN) .......................... 202311563369.9

(51) Int. Cl.
| | |
|---|---|
| *B22F 10/64* | (2021.01) |
| *B22F 10/28* | (2021.01) |
| *B23K 26/342* | (2014.01) |
| *B23K 103/14* | (2006.01) |
| *B33Y 10/00* | (2015.01) |
| *B33Y 40/20* | (2020.01) |
| *B33Y 70/00* | (2020.01) |

(52) U.S. Cl.
CPC .............. *B22F 10/64* (2021.01); *B22F 10/28* (2021.01); *B23K 26/342* (2015.10); *B33Y 10/00* (2014.12);
(Continued)

(58) Field of Classification Search
CPC .... B22F 10/28; B22F 10/64; B22F 2003/248; B22F 3/15; B22F 3/24; B22F 2998/10;
(Continued)

(56) References Cited

U.S. PATENT DOCUMENTS 11,473,173 B2 * 10/2022 Nishiyama ............ B21C 29/003
11,534,806 B2 * 12/2022 Xu .......................... B21B 37/46
(Continued)

FOREIGN PATENT DOCUMENTS

| | | |
|---|---|---|
| CN | 103008657 A | 4/2013 |
| CN | 107971491 A | 5/2018 |

(Continued)

OTHER PUBLICATIONS

English translation of CN-115945697-A (Year: 2023).*
(Continued)

*Primary Examiner* — Chris Q Liu
(74) *Attorney, Agent, or Firm* — NKL Law; Allen Xue

(57) ABSTRACT

A preparation method for additive manufacturing titanium alloys involves coupling control is performed for the microstructure and the microvoids in the material to achieve the synchronous optimization of both. Firstly, the microvoids in the printed material are eliminated by printing and hot isostatic pressing technologies. Then, based on the critical temperature and time of grain growth and phase transformation, the microstructure is optimized by high-temperature and short-time heat treatment.

9 Claims, 9 Drawing Sheets

(52) U.S. Cl.
CPC ............... *B33Y 40/20* (2020.01); *B33Y 70/00* (2014.12); *B22F 2201/11* (2013.01); *B22F 2301/205* (2013.01); *B23K 2103/14* (2018.08)

(58) Field of Classification Search
CPC .......... B22F 10/00; B22F 10/25; B22F 10/36; B22F 10/14; B22F 10/18; B22F 10/366; B22F 10/38; B22F 10/66; B22F 2003/1054; B22F 2005/002; B22F 2201/013; B22F 2201/02; B22F 2201/11; B22F 2201/20; B22F 2301/15; B22F 2301/205; B22F 2998/00; B22F 2999/00; B22F 3/105; B22F 5/00
USPC .................................................... 219/121.64
See application file for complete search history.

(56) References Cited

U.S. PATENT DOCUMENTS

| | | | | |
|---|---|---|---|---|
| 2010/0140230 | A1* | 6/2010 | Schreiber | ............... C21D 9/505 219/121.14 |
| 2019/0134711 | A1* | 5/2019 | Li | ........................... B22F 10/25 |
| 2022/0002855 | A1* | 1/2022 | Grohowski, Jr. | ..... C22C 1/0458 |

FOREIGN PATENT DOCUMENTS

| | | | |
|---|---|---|---|
| CN | 112809021 | A | 5/2021 |
| CN | 113996812 | A | 2/2022 |
| CN | 115945697 | A * | 4/2023 |
| CN | 116008148 | A | 4/2023 |
| CN | 116741314 | A | 9/2023 |
| CN | 117620205 | A | 3/2024 |

OTHER PUBLICATIONS

Tammas-Williams, S. et al., "Porosity regrowth during heat treatment of hot isostatically pressed additively manufactured titanium components", Script Materialia, May 24, 2016, pp. 72-76, vol. 122.

Ivasishin, Orest M. et al., "Potential of rapid heat treatment of titanium alloys and steels", Materials Science and Engineering A, May 15, 1999, pp. 142-154, vol. 263, No. 2.

* cited by examiner

PREPARATION METHOD FOR ADDITIVE MANUFACTURING TITANIUM ALLOYS

TECHNICAL FIELD

The present invention involves the technical field of anti-fatigue material preparation and particularly relates to an additive manufacturing titanium alloy and its preparation method.

BACKGROUND

As a digital forming technology, additive manufacturing (AM) has widespread application prospects in rail transit, aerospace, biomedicine and other sectors for the advantages of high design freedom, less material waste, short delivery time, environmental friendliness, etc., which can directly manufacture engineering parts with complex geometric shapes. Titanium alloys have high specific strength and excellent corrosion resistance but have high prices and poor processability in traditional manufacturing, thus they present a leading demand for AM technology to obtain a high delivery cycle and low BTF ratio (i.e., buy-to-fly ratio, which is a ratio of the amount of raw material required to manufacture a part to the amount of material contained in the final part). Nevertheless, it is still a challenge for the large-scale application of AM titanium alloys because the AM alloys typically exhibit inferior fatigue resistance compared with the traditionally manufactured counterparts, especially under high-cycle fatigue (greater than $10^5$ cycles) operating conditions. Therefore, whether the AM titanium alloy can be widely applied in the aerospace, national defense and military industries will depend on their fatigue reliability, as fatigue is by far the most common and damaging of all forms of failure of structural load-bearing components.

Given that the fatigue cracks of AM alloys generally initiate from the microvoids induced by the printing processing, especially the near-surface microvoids, numerous investigations minimize the size or density of microvoids in printed materials through alloying, adjusting the printing process parameters, developing advanced printing equipment and surface post-treatment, etc. However, the microvoids in the printed materials are still inevitable currently, which seriously restricts the improvement of the fatigue performance of AM titanium alloys.

On the other hand, hot isostatic pressing (HIP), as a technology that can effectively close the microvoids inside materials, becomes more and more mature under the wave of rapid development of AM technology. At present, the HIP technology can completely close the internal microvoids less than 200 μm in the printed materials. However, the long holding time at high temperatures and the slow cooling rate during HIP treatment will lead to severe microstructure coarsening and a loss of the original microstructure characteristics with uniform and fine structure produced by AM. Therefore, after HIP treatment, fatigue cracks generally initiate from the coarse α laths or α colonies. In order to further improve fatigue performance, relevant researchers attempt to minimize the microstructure coarsening by decreasing the HIP temperature and combining it with the current advanced HIP rapid cooling rate (1-2° C./s) system. Although the microstructure coarsening can be reduced to some extent through the above optimization of HIP processes, it is very limited in the microstructure refinement degree compared with the cooling rate (120-410° C./s) in the traditional water quenching treatment. Therefore, some research teams focus on the regulation of the HIP post-treatment process to further refine the microstructure. Due to the vague optimization principle of fatigue performance in titanium alloys, the regulation of HIP post-processing mainly focuses on obtaining a microstructure similar to traditional manufacturing, thus the refinement degree and the improvement of fatigue performance are still limited. Meanwhile, it is easy to cause a prior β grains coarsening and the serrated α phase enriched at the grain boundary during the post-heat treatment, further leading to the fatigue cracking initiated from the serrated α phase of the prior β grain boundary. Therefore, other fatigue weaknesses that do not belong to the original AM structure will be introduced although the HIP processes can effectively heal the microvoids inside the printed materials.

To sum up, in order to improve the fatigue performance of AM titanium alloys, considerable research strives to eliminate the printed microvoids and other fatigue weaknesses during subsequent heat treatment, such as the coarse α laths or α colonies, serrated α enriched at the coarse prior β grain boundaries, by optimizing the printing processes, HIP process and the HIP post-processing. However, there is still a lack of suitable post-treatment technology to achieve their synchronous optimization. Therefore, the present invention aims to develop a simple and convenient method to effectively eliminate these fatigue weaknesses in the AM titanium alloys, so as to prepare the AM titanium alloy material with ultra-high fatigue resistance.

SUMMARY

In view of the lack of appropriate post-treatment technology to achieve synchronous optimization of microvoids and microstructure, based on a large number of attempts and the revelation of the fatigue damage mechanism, this invention proposes a strategy to regulate the microvoids and microstructure of additive manufacturing (AM) materials step by step, so as to achieve their synchronous optimization. Based on this idea, a simple and feasible post-treatment technology, namely NAMP (Net-AM preparation) technology, is developed to eliminate the microvoids in the printed titanium alloy materials while simultaneously, restoring the original AM microstructure characteristics, which can successfully avoid the appearance of fatigue weaknesses that do not belong to the AM structure itself, such as the coarse α laths or α colonies, serrated α enriched at the coarse prior β grain boundaries and the reappearance microvoids, thereby can obtain the AM titanium alloy materials having the fatigue resistance much higher than that of the traditionally manufactured materials.

To achieve the above purpose, the invention adopts the following technical solution:

1. A preparation method for additive manufacturing titanium alloy comprises the following steps:
   (1) optimizing the printing process by fixing the values of a printing layer thickness t and a scanning spacing h and adjusting the values of printing power P and scanning speed v of selected additive manufacturing titanium alloy (the selection of P and v is based on the parameters of an additive manufacturing device), so as to control an initial microvoid size in the printed materials; grinding and polishing samples printed at different printing power P and different scanning speed v; then observing by an optical microscope; selecting the printing parameter with the minimum number of microvoids (microvoid density) (less than 3/mm$^3$) and microvoid size (equivalent diameter less than 120 μm) as the optimal printing parameter, named as "as-printed state";

(2) at a certain high temperature, applying isotropic high-pressure argon in the as-printed materials for hot isostatic pressing (HIP) treatment, after holding for a certain time at the high temperature, cooling the material to a certain temperature in the HIP furnace and then taking out the material from the HIP furnace for air cooling to room temperature to eliminate printing microvoids in the material;

(3) through high-temperature laser confocal microscope, observing the grain boundary migration behavior of additive manufacturing titanium alloys, and finding that the additive manufacturing titanium alloy has a delayed grain growth phenomenon above a phase transition point, that is, a grain boundary does not immediately migrate and grow above the phase transition point, and begins to migrate gradually after holding for a certain period of time at the high temperature, wherein a phase transformation occurs immediately above the phase transition point, however, the titanium alloy prepared by the traditional forging technology does not have the delayed grain growth phenomenon; based on the asynchronism of grain growth and phase transformation in the additive manufacturing materials, holding the material treated by HIP at a certain temperature higher than the phase transition point of the selected titanium alloy for different times for solution treatment and then water cooling; grinding, polishing and corroding the samples, and then observing them under the optical microscope; and comparing the grain sizes and the intragranular lath sizes of the samples treated under different temperatures and holding times to determine that the grain size does not change and the intragranular lath width becomes thinner, that is, critical temperature and critical time at which the grain size does not grow and the lath is refined;

(4) aging the water-cooled samples after solution treatment at the critical temperature and the critical time.

In step (1), the additive manufacturing adopts a laser powder bed fusion technology; an upper limit of the selected value of the printing power P is 400-500 W, and a lower limit is 100-200 W; with 40-60 W as an increasing gradient, the printing power is increased from the lower limit to the upper limit successively according to the increasing gradient to respectively serve as the printing process parameters of the printing power P for printing operation; an upper limit of the selected value of the scanning speed v is 2000-2200 mm/s, and a lower limit is 1000-1200 mm/s; with 180-220 mm/s as an increasing gradient, the scanning speed is increased from the lower limit to the upper limit successively according to the increasing gradient to respectively serve as the printing process parameters of the scanning speed v for printing operation; the selected printing power P corresponds to different scanning speeds v respectively; the printing layer thickness t and the scanning spacing h are fixed as 20-100 μm and 70-120 μm respectively; and printing process optimization ensures that the microvoid size in the as-printed materials is controlled below 120 μm, which can be determined by XRT non-destructive microvoid detection method.

In step (2), the HIP temperature is controlled between 915° C. and 925° C., the pressure is controlled between 150 MPa and 200 MPa, and the holding time is controlled between 3 h and 5 h; the material is cooled with the furnace to 400° C.-500° C. and then air-cooled to room temperature; and after HIP treatment, XRT non-destructive microvoid detection should be performed on the material to ensure that the microvoids in the material are completely eliminated.

In step (3), the phase transition point and the phase transformation process of the titanium alloys can be determined and researched by differential scanning calorimetry (DSC); the critical temperature is determined at a temperature range from 20° C. to 120° C. higher than the phase transition point of the titanium alloys; the solution treatment temperature is selected by taking 20° C.-30° C. higher than the phase transition point of the titanium alloy as a lower limit temperature, 100-120° C. higher than the phase transition point of the titanium alloy as an upper limit temperature, and 20-30° C. as an increasing gradient; the solution treatment temperature is increased from the lower limit to the upper limit successively according to the increasing gradient to respectively serve as the determination of solution treatment temperature; the solution treatment time is selected by taking 0.5 min-2 min as a lower limit time, 8 min-20 min as an upper limit time, and 0.5-2 min as an increasing gradient; the solution treatment time is increased from the lower limit to the upper limit successively according to the increasing gradient to serve as the determination of solution treatment time respectively; the selected solution treatment temperatures correspond to different solution treatment times respectively; suspension heat treatment is used in the solution treatment to ensure that the material is heated evenly in the heat treatment furnace; and ice water cooling is used for quenching (liquid nitrogen cooling is used to control the water temperature below 0° C.) to ensure that the material achieves high hardenability.

In step (4), the solution treatment at the critical temperature and the critical time refers to high-temperature and short-time solution treatment; the samples after solution treatment and water cooling are aged; and the aging treatment adopts low-temperature aging treatment at the temperature of 500° C.-550° C. and the holding time of 4 h-6 h to completely remove quenching residual stress and ensure that the material is fully strengthened.

The titanium alloy is α+β alloy.

The critical temperature is higher than the phase transition point of the titanium alloy by 40-65° C., and the critical time is 3 min-5 min.

The printing layer thickness t and the scanning spacing h are fixed as 50 μm-70 μm and 90 μm-110 μm respectively.

The titanium alloy prepared by the preparation method has ultra-high resistance to high cycle fatigue.

The design mechanism and the beneficial effects of the present invention are as follows:

1. The present invention proposes a method of regulation step by step to synchronously optimize the microvoids and microstructure, and overcomes the barriers such as inevitable printing microvoids, lath coarsening and grain boundary α phase during the traditional AM printing technology, HIP treatment and post heat treatment. The present invention can be used for conveniently and quickly preparing the additive manufacturing titanium alloy materials with ultra-high resistance to high cycle fatigue without the need to strictly control the microvoid density in the printed materials and the microstructure coarsening under HIP, which avoids meticulously optimizing the AM printing process and the HIP technology traditionally. The present invention proposes a new idea of anti-fatigue design for the additive manufacturing titanium alloys, including loose AM printing and HIP treatment, but accurate high-temperature and short-time heat treatment, which greatly saves the cost and increases efficiency.

2. The present invention can be used for effectively eliminating the microvoids in the AM titanium alloy materials and simultaneously restoring the AM microstructure characteristics, so as to avoid the fatigue weaknesses that do not belong to part of the additive manufacturing structure itself, such as lath and colony coarsening, serrated α enriched at the coarse prior β grain boundaries and reappearance microvoids of subsequent heat treatment. The present invention clarifies the ultra-high fatigue resistance of the additive manufacturing structure itself and the great potential of the additive manufacturing technology in fabricating anti-fatigue components.

3. The idea and the design concept of Net- or microvoid-free additive manufacturing microstructural materials proposed by the present invention will not be limited to titanium alloys, and may be extended to other additive manufacturing metallic materials, such as aluminum alloys, steels, high entropy alloys, etc. to obtain excellent fatigue performance.

4. The present invention provides the guidance for the current research on the optimization of the printing process. That is, if the microvoids in the printing process are eliminated through continuous technical innovation, the Net-AM material with ultra-high fatigue resistance can be directly generated, which will greatly promote the application in aerospace fields as a bearing structural part in the future.

5. The present invention provides the guidance for the current research on the optimization of the HIP process and HIP post-processing. That is, the titanium alloy with high fatigue resistance can be achieved by obtaining the microstructure type of additive manufacturing through further refining the microstructure.

DETAILED DESCRIPTION

The present invention will be described below in detail in combination with the embodiments. In the present embodiment, α+β titanium alloy (designation Ti-6Al-4V) which is the most widely used in titanium alloy is taken as an example to prepare the material. Specific steps are as follows:

Embodiment 1

Figure 1:
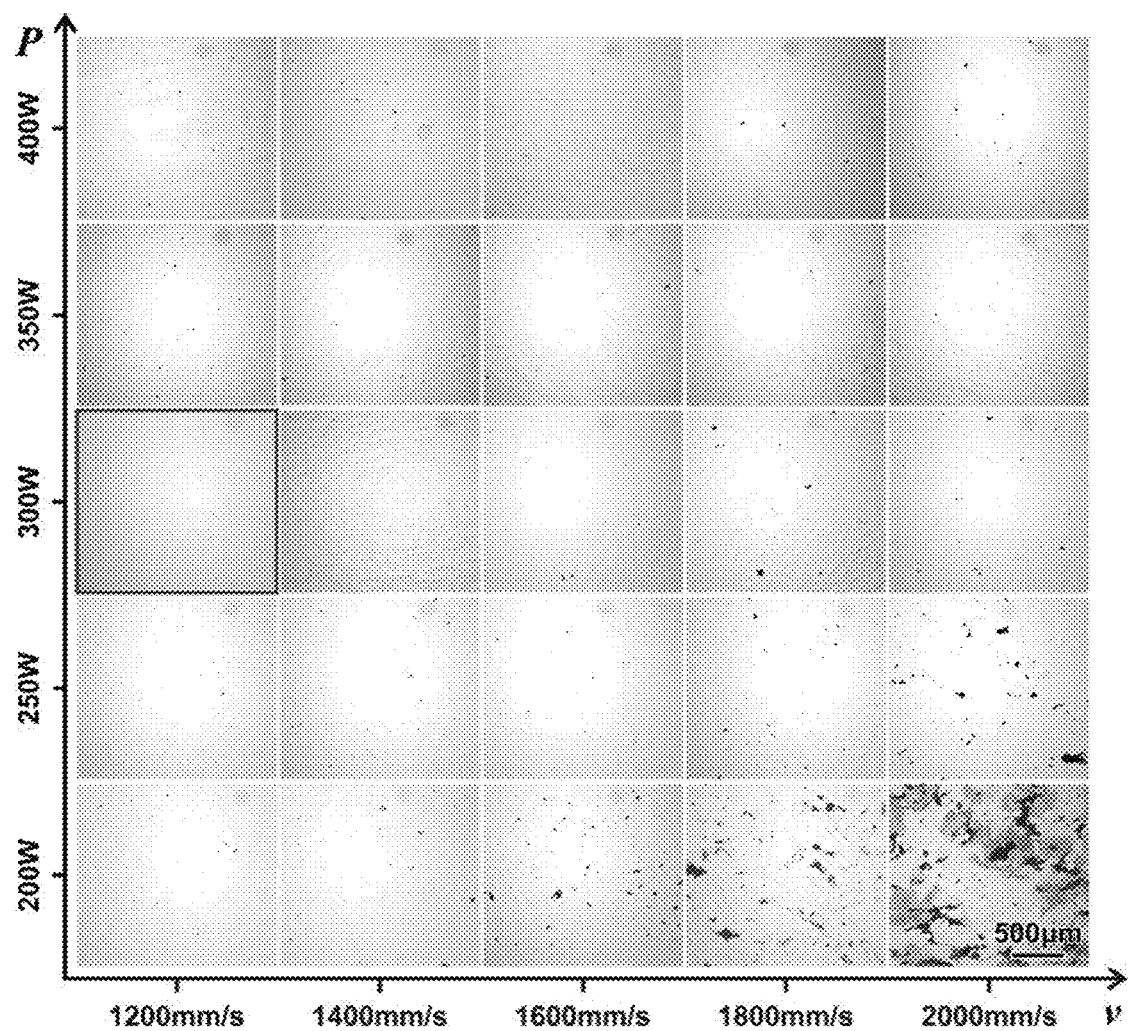
FIG. 1 shows the distribution of metallographic microvoids at different printing powers and scanning speeds.
Figure 2:
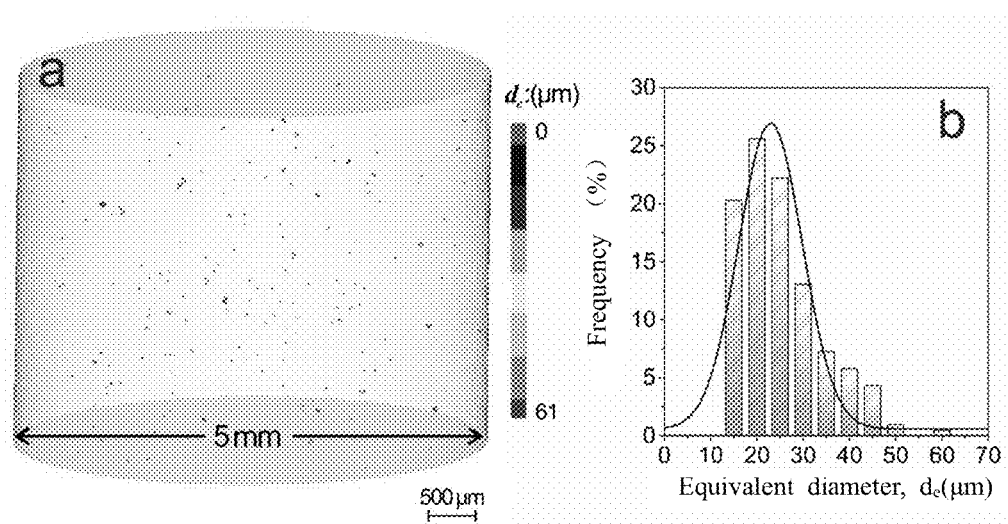
FIG. 2 shows the XRT microvoid distribution and statistical results of the as-printed material.
Figure 3:
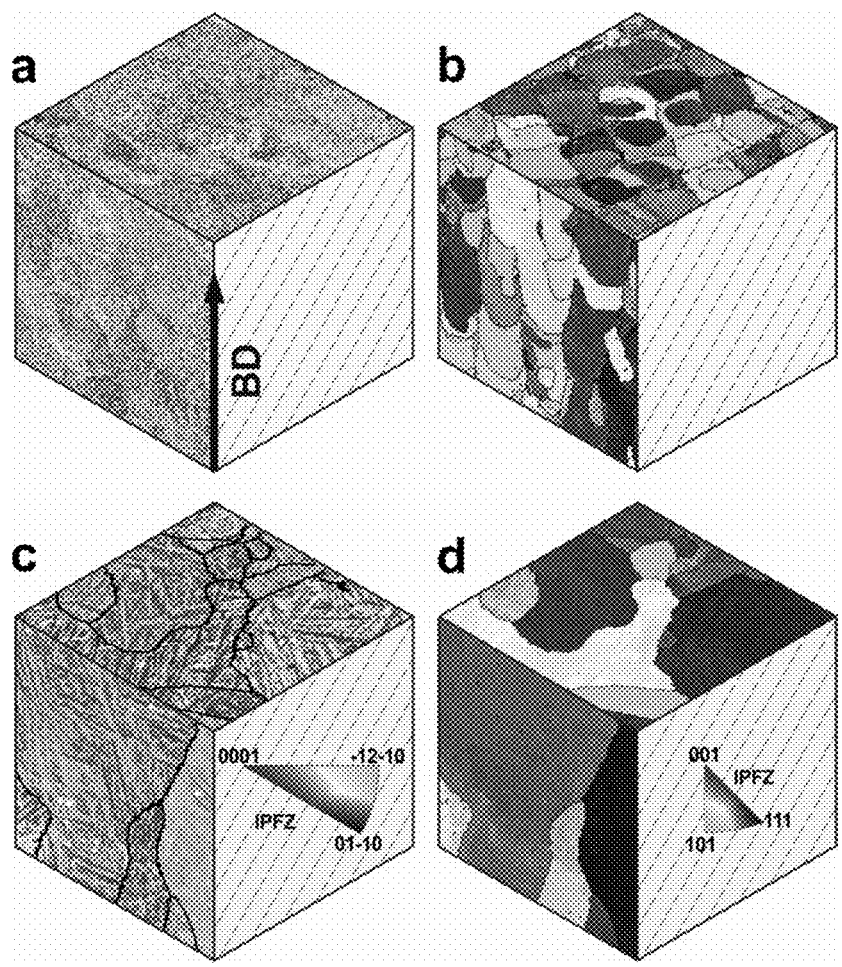
FIG. 3 shows the EBSD microstructure of the as-printed material.

Step 1: powder layer thickness (printing layer thickness) t and scanning spacing h for laser powder bed fusion were fixed as 60 μm and 100 μm, and the printing power P and the scanning speed v were adjusted for material preparation and optimization of the printing technology. The selection of the powder layer thickness t=60 μm can ensure complete inter-layer fusion and reduce the temperature gradient between the printing layers, so as to achieve the purpose of equiaxed grains (smaller than columnar grains) and reduction of the printing microvoids, as specifically demonstrated in reference example 1. According to the maximum power of 500 W and the frequently-used power of 200 W-400 W of the additive manufacturing device, 50 W was selected as an increasing gradient. Specifically, the sample gradient of the printing process parameters of the printing power P was established with 200 W, 250 W, 300 W, 350 W and 400 W. In order to increase the additive efficiency, the scanning speed can be increased as much as possible. However, for the present embodiment, the scanning speed of the device is higher than 2200 mm/s, the laser beam is also unstable and distorted, and the selected titanium alloy powder cannot be fully fused due to the overhigh scanning speed. Therefore, in the present embodiment, the range of the scanning speed v was selected as 1200 mm/s-2000 mm/s, and 200 mm/s was used as a gradient. Specifically, the sample gradient of the printing process parameters of the scanning speed v was established with 1200 mm/s, 1400 mm/s, 1600 mm/s, 1800 mm/s and 2000 mm/s. Each printing power P corresponds to five different scanning speeds v respectively, to finally obtain 25 printed samples. As shown in FIG. 1, the samples printed at different printing powers P and scanning speeds v were ground, polished and then observed under an optical microscope. It can be seen that the lower the energy density was (corresponding to smaller P and larger v), the more easily unfused microvoids were generated, and the higher the energy density was (corresponding to larger P and smaller v), the more easily pore microvoids were generated. According to the printing results in FIG. 1, the samples with the smallest microvoid density (average 2/mm$^3$) and the smallest microvoid size were selected, and the optimal printing technology was determined as power P=300 W and scanning speed v=1200 mm/s, named the as-printing state. Through XRT non-destructive microvoid detection, as shown in FIG. 2, the equivalent diameter $d_e$ of the microvoids of the as-printed material was below 120 μm. Moreover, according to FIG. 3, it can be seen that the microstructure of the as-printed material was uniform equiaxed grains with fine α laths distributed inside the grains, indicating that the printing process parameters were good.

Figure 4:
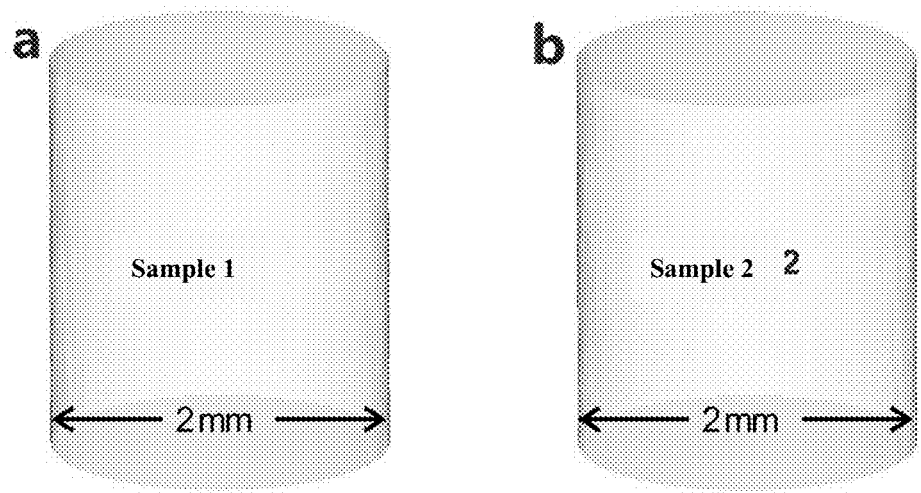
FIG. 4 shows the XRT microvoid detection results of the as-printed materials after the HIP treatment.

Step 2: at 920° C., isotropic high-pressure argon with a pressure of 150 MPa was applied to the as-printed material for HIP treatment. After holding for 3 h, the material was cooled with the furnace to 500° C. and then air-cooled to room temperature, named HIP state. After HIP treatment, two samples were randomly selected for XRT non-destructive microvoid detection. As shown in FIG. 4, no microvoid was detected in the two samples, indicating that the microvoids in the printed material were completely eliminated after HIP, and the material without microvoids was preliminarily obtained.

Figure 5:
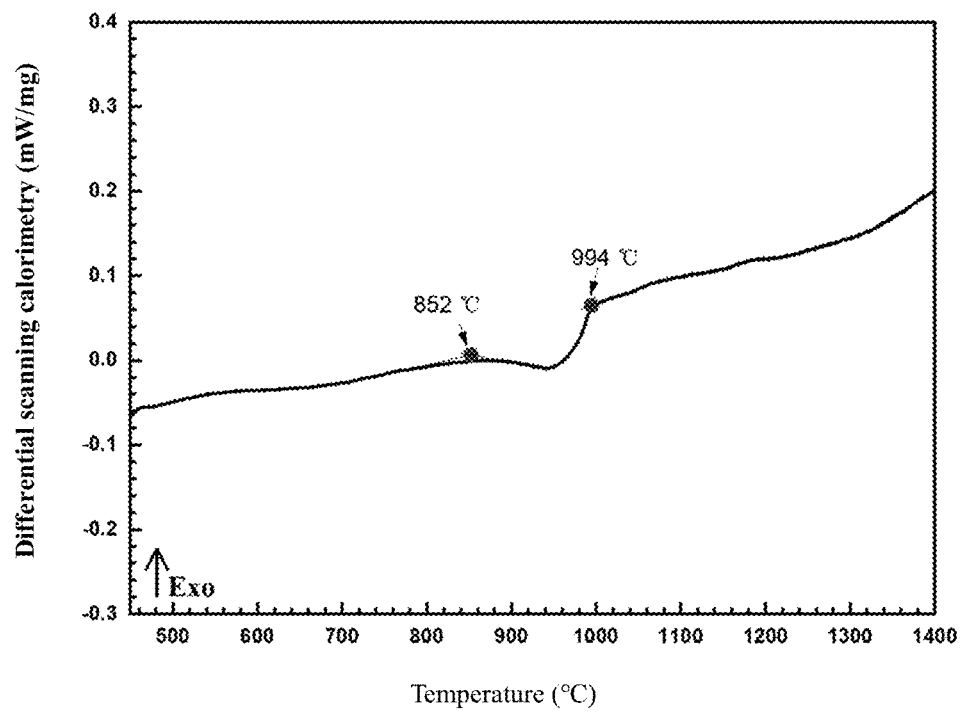
FIG. 5 shows a heating curve of differential scanning calorimetry (DSC).
Figure 6:
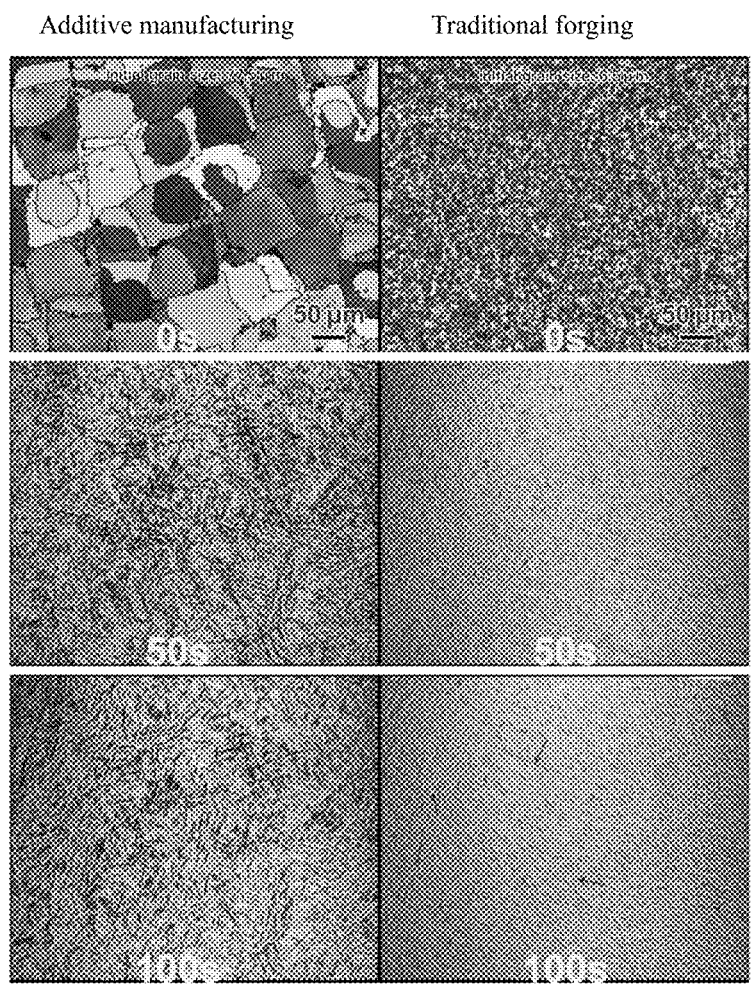
FIG. 6 shows the grain boundary migration behaviors of additive manufacturing and forged titanium alloys at high temperatures, shot by the high-temperature laser confocal microscope.
Figure 7:
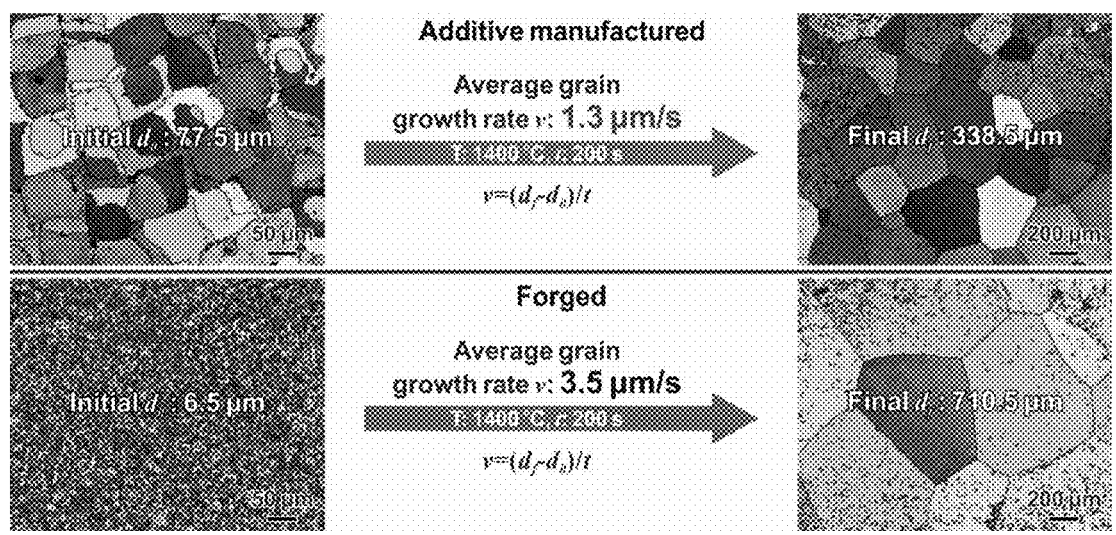
FIG. 7 shows the initial EBSD grain images of additive manufacturing and forged titanium alloys and the EBSD grain images after holding at the same temperature for the same time.
Figure 8:
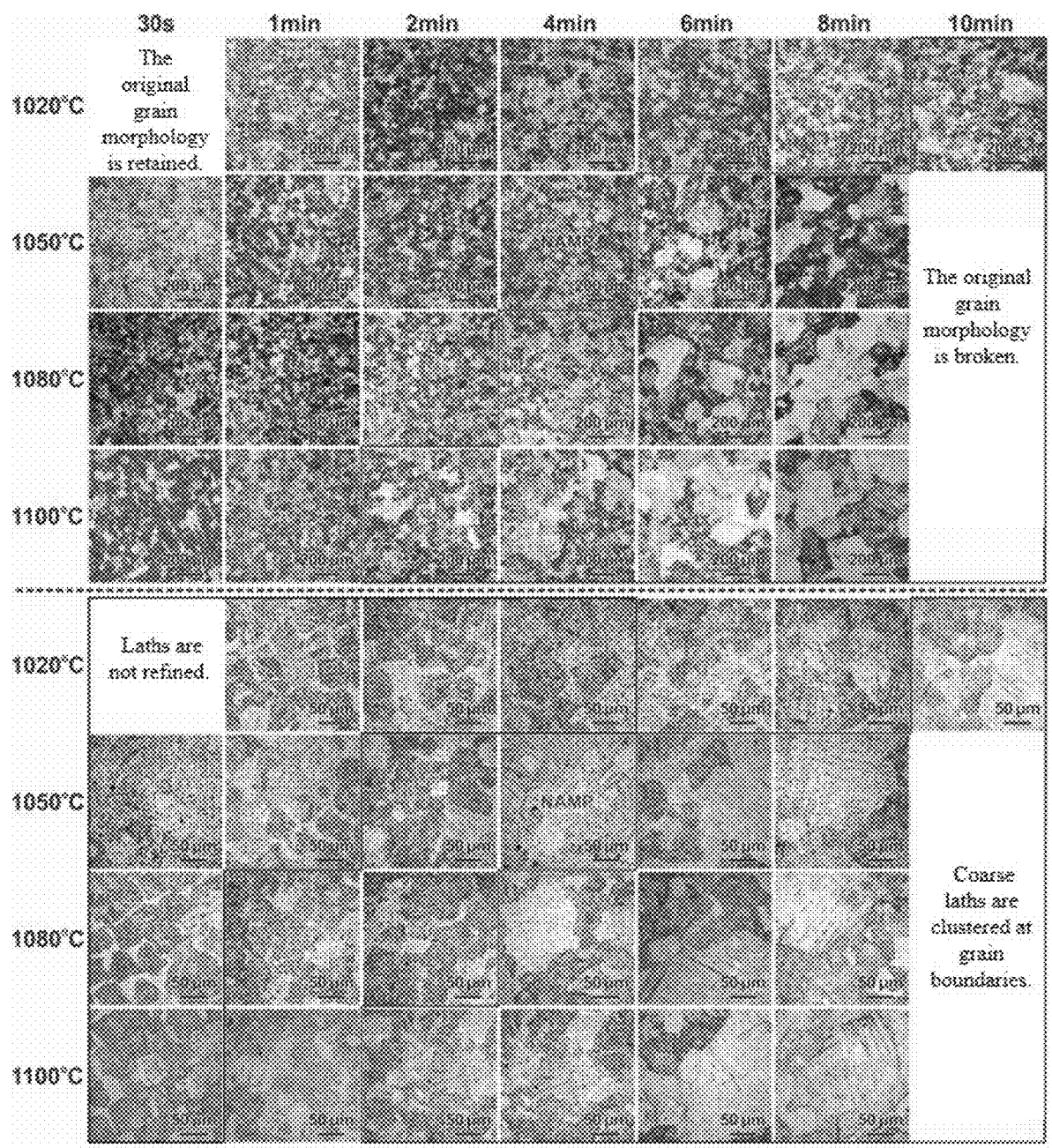
FIG. 8 shows grain morphology and lath sizes after quenching at different holding temperatures for different times.

Step 3: differential scanning calorimetry (DSC) was performed on the material to determine the phase transition point of the Ti-6Al-4V titanium alloy as 994° C., as shown in FIG. 5, wherein 852° C. was only the temperature at which part of the $\alpha$ phase began the phase transition, while the whole $\alpha$ phase in the titanium alloy above 994° C. can be completely transformed into $\beta$ phase. The grain boundary migration behaviors of the additive manufacturing titanium alloy and forged titanium alloy were researched at 1400° C. by a high-temperature laser confocus microscope, wherein grain boundary traces cannot be captured at rapidly moving grain boundaries. Only stable grain boundaries can capture the grain boundary traces marked with a red arrow, as shown in FIG. 6. When heated to the same temperature, a large number of grain boundaries in the forged titanium alloy migrated rapidly at the beginning, and only a few stable grain boundaries can capture the grain boundary traces. However, a large number of grain boundaries in additive manufacturing did not migrate immediately, and the grain boundaries were still stable at high temperature, so there was a phenomenon of grain boundary relaxation. The grain boundaries began to migrate gradually after holding for a certain time. Therefore, after holding for 200 s finally, the grain size of the additive manufacturing titanium alloy was less than that of the forged titanium alloy, as shown in FIG. 7. The phase transition of the forged titanium alloy and the additive manufacturing titanium alloy occurred immediately above the phase transition point under the superheat drive. Based on the asynchronism of grain growth and phase transition of additive manufacturing, the material after HIP treatment of step 2 was held at different temperatures above the phase transition point 994° C. of Ti-6Al-4V titanium alloy for different times for solution treatment and then water-cooled. The temperature above the phase transition point of Ti-6Al-4V titanium alloy by 26-106° C. was selected. 1020° C. was used as the initial temperature, and 20-30° C. was used as a gradient to select the solution treatment temperatures, specifically 1020° C., 1050° C., 1080° C. and 1100° C. Seven different solution treatment times were determined at each solution temperature respectively. 30 s was used as the initial time, and 0.5-2 min was used as a gradient to select the solution treatment times, specifically 30 s, 1 min, 2 min, 4 min, 6 min, 8 min and 10 min. Finally, 28 samples after solution treatment were obtained, and then ground, polished and subjected to metallographic etching; and the morphology and size of the grains and the size change of the intragranular lath were observed under the optical microscope. As shown in FIG. 8, at 1020° C., the temperature was too low, the driving force of phase transition was small, and the laths in the grains were completely refined by at least 8 min; and a tendency of grain growth may exist beyond 8 min. At the same time, the defects such as tiny vacancies, microvoids, etc. had a long enough time to diffuse and accumulate during this period, so that the microvoids recurred in the material [S. Tammas-Williams, P. J. Withers, Todd, P. B. Prangnell, Porosity regrowth during heat treatment of hot isostatically pressed additively manufactured titanium components; Script Materialia 122(2016) 72-76]; and when the temperature was high, the grain growth rate was too fast; and as shown in FIG. 8, the grains began to grow abnormally within 1 min at 1080° C. and 1100° C. The excessively rapid growth of the grains made the intragranular phase unable to transform completely in time, so that the laths cannot be completely refined [O. M. Ivasishin, R. V. Teliovich, Potential of rapid heat treatment of titanium alloys and steels; Materials Science and Engineering A263 (1999) 142-154]. According to FIG. 8, it can be seen that the temperature was held at 1050° C.; the grains began to grow abnormally beyond 4 min; and the time of 4 min was enough for completely refining the intragranular lath. Therefore, an appropriate critical temperature was determined as 1050° C. and critical time was determined as 4 min. The solution treatment at the critical temperature and the critical time refers to high-temperature and short-time (1050° C., 4 min) solution treatment. Suspension heat treatment is used in the high-temperature and short-time solution treatment to ensure that the material was heated evenly in the heat treatment furnace; and ice water cooling was used for quenching (liquid nitrogen cooling was used to control the water temperature below 0° C.) to ensure that the material achieved high hardenability.

Step 4: the samples after solution treatment at the critical temperature and the critical time-were aged; and the aging treatment adopted low-temperature aging treatment at the temperature of 500° C. and the holding time of 6 h to completely remove quenching residual stress to ensure that the material was fully strengthened.

Figure 9:
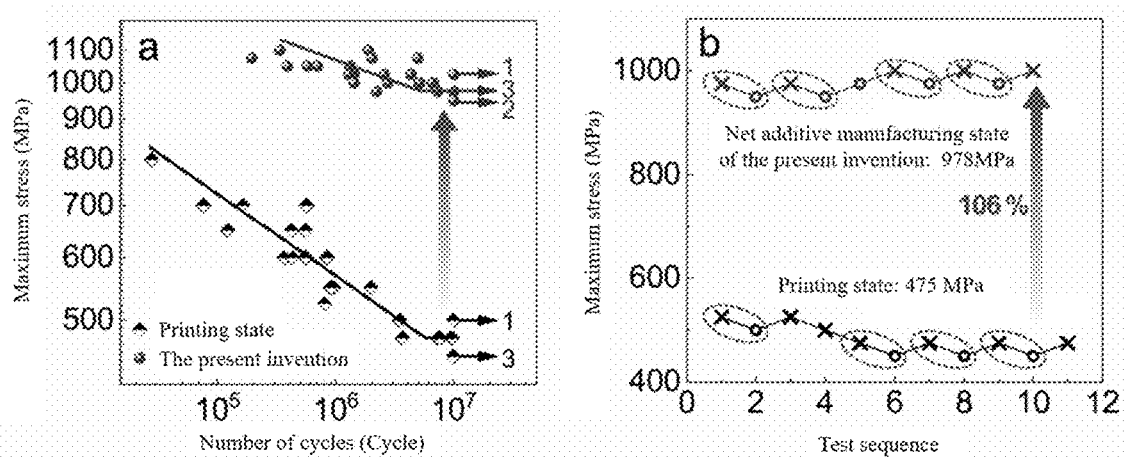
FIG. 9 shows the fatigue performance testing results and performance curves of α+β titanium alloy (designation Ti-6Al-4V) prepared in the as-printing state and using the present invention.
Figure 10:
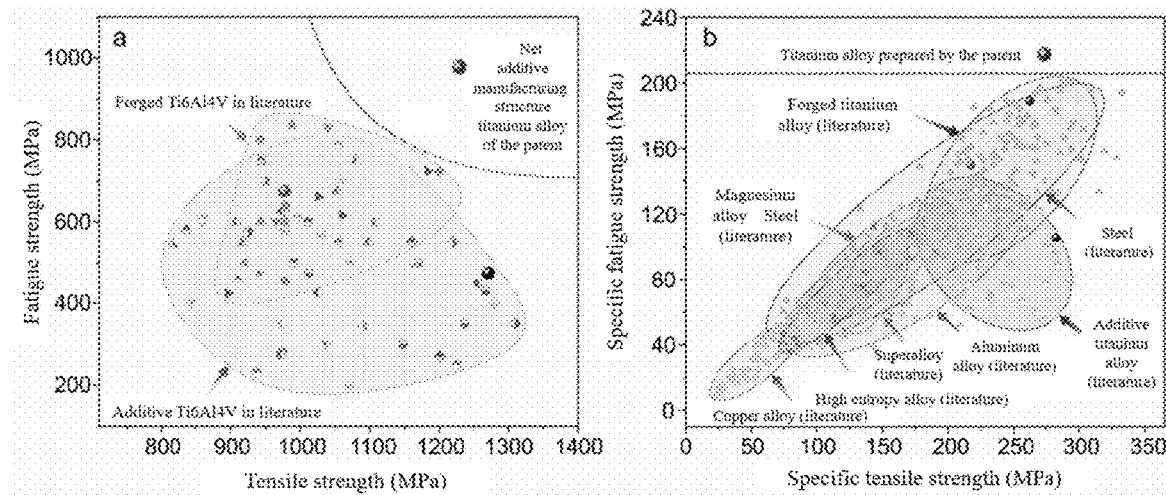
FIG. 10 shows the comparison results of fatigue performance of α+β titanium alloy (designation Ti-6Al-4V) prepared by the present invention and other materials in the literature.

The tension-tension fatigue performance testing with a stress ratio of R=0.1 was further performed for the additive manufacturing Ti-6Al-4V material prepared by the present invention. As shown in FIG. 9 panel a, the additive manufacturing Ti-6Al-4V material prepared by the present invention presents a significant increase in fatigue life compared with the printing state. The fatigue strength was tested and determined by a standard lifting method. As shown in FIG. 9 panel b, the fatigue strength of the additive manufacturing Ti-6Al-4V material prepared by the present invention reaches astonishing 978 MPa, and the fatigue strength is increased by 106% compared with the original state. The additive manufacturing Ti-6Al-4V material prepared by the present invention is further compared with the literature data, as shown in FIG. 10. It can be seen that the additive manufacturing Ti-6Al-4V material prepared by the present invention is much higher than the additive manufacturing Ti-6Al-4V alloy reported in the literature, and even higher than the traditional forged titanium alloy (FIG. 10 panel a). It is found (FIG. 10 panel b) by comparing the net additive manufacturing structure Ti-6Al-4V prepared by the present invention with other materials that the net additive manufacturing structure Ti-6Al-4V alloy manufactured by the present invention exhibits the highest resistance to high cycle fatigue, which is much higher than that of all metal materials. It proves that the present invention can conveniently and quickly obtain the additive manufacturing titanium alloy with ultrahigh resistance to high cycle fatigue without the need to strictly control the microvoid density in the printed material and the structure coarsening under HIP, which greatly saves the cost and increases the efficiency. Meanwhile, the present invention clarifies the ultrahigh fatigue resistance of the additive manufacturing structure, and clarifies the great potential of the additive manufacturing technology in manufacturing anti-fatigue structural parts.

Reference Example 1

Figure 11:
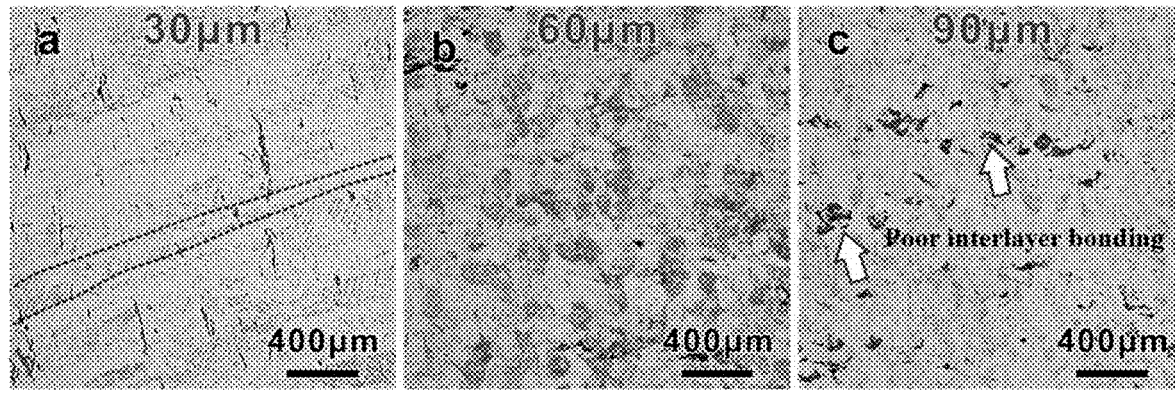
FIG. 11 shows the microstructure and metallographic microvoid distribution of the as-printed materials at the layer thickness of reference example 1 and reference example 2.

The preparation method of the additive manufacturing titanium alloy is the same as that of embodiment 1. The differences are that: the printing layer thickness t in step 1 is 30 μm, and the experimental results are shown in FIG. 11 panel a. At 30 μm, the powder is too thin, which results in a large interlayer temperature gradient, thereby causing the preferential growth of the grains and forming columnar grains.

Reference Example 2

The preparation method of the additive manufacturing titanium alloy is the same as that of embodiment 1. The differences are that: the printing layer thickness t in step 1 is 90 μm, and the experimental results are shown in FIG. 11 panel c. At 90 μm, the powder is too thick, which results in poor interlayer powder combination and easy formation of cracks and microvoids.

Reference Example 3

The preparation method of the additive manufacturing titanium alloy is the same as that of embodiment 1. The difference is that: HIP treatment in step 2 is not conducted. Because the printing microvoids are not completely eliminated before the subsequent heat treatment structure optimization, stress concentration is easy to occur around the microvoids in the fatigue process so fatigue cracks occur in advance, causing fatigue cracking. Thus, the fatigue resistance of the microstructure itself cannot be presented, that is, the microstructure optimization effects of the step 2 and step 3 will be completely covered by the harmful influences of the microvoids, and the effect will be greatly reduced.

Reference Example 4

Figure 12:
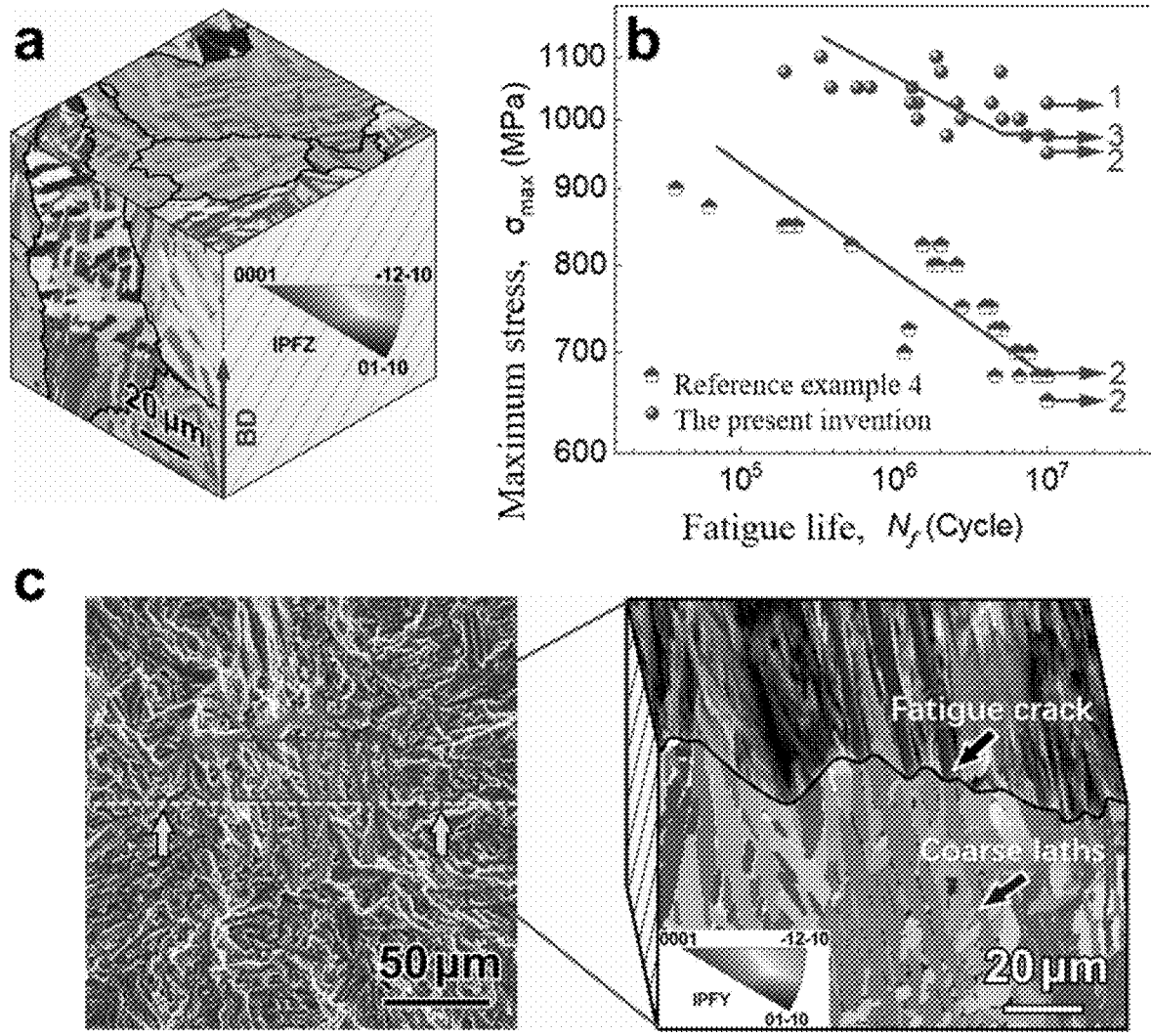
FIG. 12 shows the microstructure, fatigue performance and fatigue cracking positions of the material prepared in reference example 4.

The preparation method of the additive manufacturing titanium alloy is the same as that of embodiment 1. The difference is that: step 3 is not conducted. The structural characteristics are shown in FIG. 12 panel a, and the fatigue performance is shown in FIG. 12 panel b. It can be seen that the fatigue performance is much lower than that of embodiment 1. This is mainly due to the serious coarsening of the microstructure in the HIP process, which leads to the easy generation of fatigue cracks from the coarse laths and the poor fatigue resistance, as shown in FIG. 12 panel c.

Reference Example 5

Figure 13:
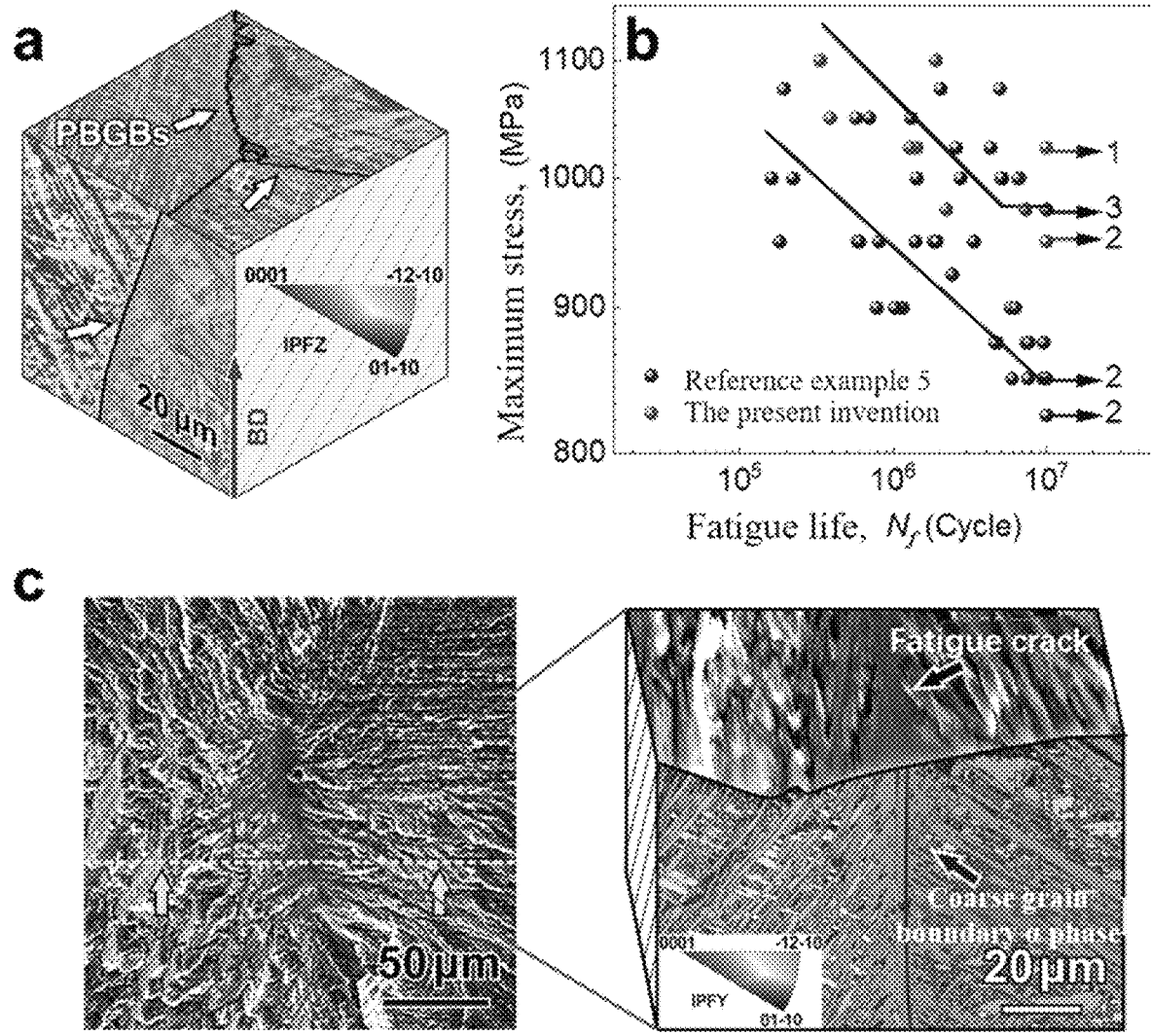
FIG. 13 shows the microstructure, fatigue performance and fatigue cracking positions of the material prepared in reference example 5.

The preparation method of the additive manufacturing titanium alloy is the same as that of embodiment 1. The differences are that: the heat treatment mode of step 3 is changed; step 2 of determining the critical temperature and time is not conducted; the conventional solution aging heat treatment is adopted; the solution temperature and the aging mode are the same as those of embodiment 1; and the solution time is 1 h, not the critical time of the corresponding temperature. The structural characteristics are shown in FIG. 13 panel a, and the fatigue performance is shown in FIG. 13 panel b. It can be seen that the fatigue performance is much lower than that of embodiment 1. This is mainly due to the abnormal growth of grains in the traditional heat treatment, which leads to coarsening of the grain boundaries and serrated α phase enriched at the grain boundaries, thereby causing easy generation of fatigue cracks from the serrated α phase enriched at the coarse grain boundaries and poor fatigue resistance, as shown in FIG. 13 panel c.

To sum up, the present invention is innovative in that the present invention considers the coupling influence of the microstructure and microvoids and adopts regulation step by step to realize synchronous optimization of the microstructure and microvoids, does not blindly reduce the microvoids and ignores the influence of the microstructure, does not blindly refine the microstructure and ignore the influence of the microvoids, and comprehensively considers the shortcomings of the printing technology, the HIP technology and the traditional heat treatment technology in terms of the microstructure and the microvoids. The present invention overcomes the inevitable barriers such as printing microvoids, such as the coarse α laths or α colonies, serrated α enriched at the coarse prior β grain boundaries lath coarsening and grain boundary α phase in the traditional printing processes, HIP process and the HIP post-processing by the method of coupling regulation, and can conveniently and quickly prepare the additive manufacturing titanium alloy materials with ultra-high resistance to high cycle fatigue without the need to strictly control the microvoid density in the printed material and the microstructure coarsening under HIP treatment, which avoids meticulously optimizing the printing technology and the HIP technology traditionally, greatly saves the cost and increases the efficiency.

The above only describes preferred embodiments of the present invention and is not intended to limit the present invention in any form. Any simple amendment, equivalent change and modification made to the above embodiments according to the technical essence of the present invention shall still belong to the scope of the technical solutions of the present invention.

The invention claimed is:

1. A preparation method for additive manufacturing titanium alloy, comprising:
   S1: printing a plurality of printed samples of additive manufacturing titanium alloy at a fixed thickness t and a fixed scanning spacing h, and a plurality of printing powers P, and a plurality of scanning speeds v, so as to control an initial microvoid size in each printed sample; grinding and polishing the plurality of printed samples; selecting an optimal printed sample with a minimum number of microvoids and a minimum microvoid size and defining a printing state that has optimal printing parameters as parameters under which the optimal printed sample is printed;
   S2: obtaining a printed material of additive manufacturing titanium alloy printed according to the printing state; applying an isotropic high pressure argon to the printed material for an isostatic pressing (HIP) treatment at an elevated temperature for a certain period of time, cooling the printed material to a lower temperature in an HIP furnace; and then air cooling the printed material to room temperature to eliminate printing microvoids;
   S3: determining a phase transition point of the titanium alloy, holding the temperature for the printed material from S2 at a plurality of temperatures that are higher than the phase transition point of the titanium alloy for a plurality of durations of time for solution treatment and then water cooling to obtain a plurality of solution-treated printed samples; grinding, polishing and corroding the plurality of solution-treated printed samples; and determining a critical temperature and a critical time by comparing the grain sizes and the intragranular lath sizes of the plurality of solution-treated printed samples, wherein at the critical temperature and the critical time the grain size of solution-treated printed samples cease to change and the intragranular lath width becomes thinner; and S4: aging the solution-treated printed sample at the critical temperature and the critical time.

2. The preparation method according to claim 1, wherein, in S1, the printing power is configured to increase from a lower limit ranging from 100-200 w to an upper limit of 400-500 w at a gradient of 40-60 w;

the scanning speed is configured to increase from a lower limit of 1000-1200 mm/s to an upper limit of 2000-2200 mm/s at a gradient of 180-220 mm/s; and the thickness t is in a range of 20-100 μm and the scanning spacing h is in a range of 70-120 μm.

3. The preparation method according to claim 1, wherein, in S2, the HIP treatment is carried out at 915° C. to 925° C., under 150 MPa to 200 MPa for 3 h to 5 h; and the printed material is cooled in the HIP furnace to 400-500° C. and then air-cooled to room temperature.

4. The preparation method according to claim 1, wherein, in S3, the critical temperature is 20° C. to 120° C. higher than the phase transition point of the titanium alloy.

5. The preparation method according to claim 4, wherein the critical temperature is higher than the phase transition point of the titanium alloy by 40° C.-65° C., and the critical time is 3 min-5 min.

6. The preparation method according to claim 1, wherein S4 further comprises an aging treatment carried out at a temperature of 500° C.-550° C. and a holding time of 4 h-6 h.

7. The preparation method according to claim 1, wherein the titanium alloy is α+β alloy.

8. The preparation method according to claim 1, wherein the critical temperature is higher than the phase transition point of the titanium alloy by 40° C.-65° C., and the critical time is 3 min-5 min.

9. The preparation method according to claim 1, wherein the thickness t is a value of 50-70 μm and the scanning spacing h is a value of 90-110 μm.

* * * * *